US008856525B2

(12) United States Patent
Kaplan

(10) Patent No.: US 8,856,525 B2
(45) Date of Patent: Oct. 7, 2014

(54) AUTHENTICATION OF EMAIL SERVERS AND PERSONAL COMPUTERS

(76) Inventor: Michael Gregor Kaplan, New York, NY (US)

( * ) Notice: Subject to any disclaimer, the term of this patent is extended or adjusted under 35 U.S.C. 154(b) by 611 days.

(21) Appl. No.: 12/583,055

(22) Filed: Aug. 13, 2009

(65) Prior Publication Data

US 2011/0040974 A1   Feb. 17, 2011

(51) Int. Cl.
*H04L 9/32* (2006.01)
*H04L 12/58* (2006.01)

(52) U.S. Cl.
CPC .............. *H04L 12/58* (2013.01); *H04L 9/3236* (2013.01); *H04L 9/3247* (2013.01)
USPC ...................... 713/168; 726/1; 726/2; 726/22

(58) Field of Classification Search
USPC .......................................... 713/179; 709/206
See application file for complete search history.

(56) References Cited

U.S. PATENT DOCUMENTS

| 6,986,049 | B2 | | 1/2006 | Delany | |
|---|---|---|---|---|---|
| 7,698,744 | B2 | * | 4/2010 | Fanton et al. | 726/27 |
| 8,321,516 | B2 | * | 11/2012 | Sargent et al. | 709/206 |
| 2002/0078351 | A1 | * | 6/2002 | Garib | 713/168 |
| 2003/0163705 | A1 | * | 8/2003 | Richards et al. | 713/182 |
| 2004/0059909 | A1 | * | 3/2004 | Le Pennec et al. | 713/153 |
| 2004/0203589 | A1 | * | 10/2004 | Wang et al. | 455/410 |
| 2004/0221014 | A1 | * | 11/2004 | Tomkow | 709/206 |
| 2005/0114461 | A1 | * | 5/2005 | Shirai et al. | 709/207 |
| 2006/0026246 | A1 | * | 2/2006 | Fukuhara et al. | 709/206 |
| 2006/0200523 | A1 | * | 9/2006 | Tokuda et al. | 709/206 |
| 2006/0253852 | A1 | * | 11/2006 | Honda et al. | 717/177 |
| 2006/0259762 | A1 | * | 11/2006 | Tanimoto | 713/156 |
| 2007/0124578 | A1 | * | 5/2007 | Paya et al. | 713/155 |
| 2007/0162394 | A1 | * | 7/2007 | Zager et al. | 705/51 |
| 2008/0028443 | A1 | * | 1/2008 | Adelman et al. | 726/4 |
| 2008/0250483 | A1 | * | 10/2008 | Lee | 726/7 |
| 2008/0279373 | A1 | * | 11/2008 | Erhart et al. | 380/46 |
| 2009/0089869 | A1 | * | 4/2009 | Varghese | 726/7 |
| 2009/0178125 | A1 | * | 7/2009 | Barber et al. | 726/6 |
| 2009/0319781 | A1 | * | 12/2009 | Byrum et al. | 713/156 |

OTHER PUBLICATIONS

Abadi, Martin et al., "Moderately Hard, Memory-bound Functions", published about 2006, research.Microsoft.com/pubs/54395/memory-longer-acm.pdf, pp. 1-27.

\* cited by examiner

*Primary Examiner* — Jung Kim
*Assistant Examiner* — Tri Tran
(74) *Attorney, Agent, or Firm* — Brenda Pomerance

(57) ABSTRACT

An originating email server is authenticated by a destination email server using a public key provided by the originating email server, thereby making it possible to detect an email with a forged origination address with no action required by a domain owner. A personal computer is authenticated using a reputation report associated with a unique number corresponding to the personal computer, enabling, in one embodiment, spam detection, and, in another embodiment, a decision that a valid user is requesting service registration at a website.

21 Claims, 9 Drawing Sheets

AUTHENTICATION OF EMAIL SERVERS AND PERSONAL COMPUTERS

BACKGROUND OF THE INVENTION

The present invention relates to data security, and more particularly, is directed to determining the actual source of an electronic mail message. The present invention also is directed to determining the actual source of an electronic message to a website.

Unsolicited commercial email is popularly known as "spam". It has been estimated that 90% of email messages are spam, corresponding to 100 billion daily spam emails.

Email addresses are easy to forge. Spammers often employ forged email addresses when their spam is disguised as legitimate email, e.g., phishing, wherein a spammer sends an email purporting to be from a legitimate website, generally to induce an unsuspecting party to provide their log-in name and password for the website.

However, it is not so easy to reliably determine that an email has a forged address.

Existing email authentication schemes require that the email administrator for the domain actively participate, which has resulted in such schemes being not used for most domains. The ability to reliably authenticate the origin of an email would be of great utility to email processing systems, as that email could be readily identified as spam.

Digital signatures are formed using a private cryptographic key to encrypt data associated with a message. The receiver uses a public cryptographic key to decrypt the data thereby recovering a plaintext version of the associated data. However, the difficulty of establishing an infrastructure to distribute public keys for email source authentication has hampered use of digital signatures for this purpose.

Websites that provide services, such as free email accounts, are often the targets of improper users who register for many accounts and then abuse them. To prevent programs from registering, that is, to ensure people register, such websites often employ a CAPTCHA test that is difficult for a computer to solve but relatively easy for a human to solve. Popular types of CAPTCHAs include graphic images of characters or words that have been subject to various visual distortions.

However, CAPTCHAs are generally annoying to humans, software programs can do a pretty good job of solving many CAPTCHAs, and spammers sometimes employ low-wage individuals to register for new accounts. Thus, there is room for an improved technique that protects websites from improper registrations.

SUMMARY OF THE INVENTION

In accordance with an aspect of this invention, there is provided a method for authentication of a source of an email, comprising receiving an email, extracting an originating mail server and a digital signature from the received email, decrypting the digital signature with a public key associated with the originating mail server to yield a decrypted hash, generating a generated hash for the received email, comparing the decrypted hash with the generated hash to detect a match, and when a match is detected, determining that the originating mail server of the received email is authenticated.

In accordance with another aspect of this invention, there is provided a method for enabling authentication of a source of an email, the method being performed by an originating mail server. An email ready to be sent is obtained. A hash is generated for the received email, and then encrypted with a private key to generate a digital signature, the private key having been locally generated. The digital signature is prepended to the email, and the prepended email is sent to a recipient.

In accordance with a further aspect of this invention, there is provided a method for authenticating a personal computer that has taken an action. An executing computer receives encrypted data including a unique number associated with the personal computer, the encrypted data having been encrypted with a public key. The executing computer sends the encrypted data to a holder of a private key corresponding to the public key, and receives a reputation report associated with the unique number in the encrypted data. The executing computer determines whether the personal computer should be authenticated based on the reputation report, and complies with the action only if the personal computer is determined to be authentic.

The action may be sending an email or registering for a service at a website.

It is not intended that the invention be summarized here in its entirety. Rather, further features, aspects and advantages of the invention are set forth in or are apparent from the following description and drawings.

DETAILED DESCRIPTION

Figure 1:
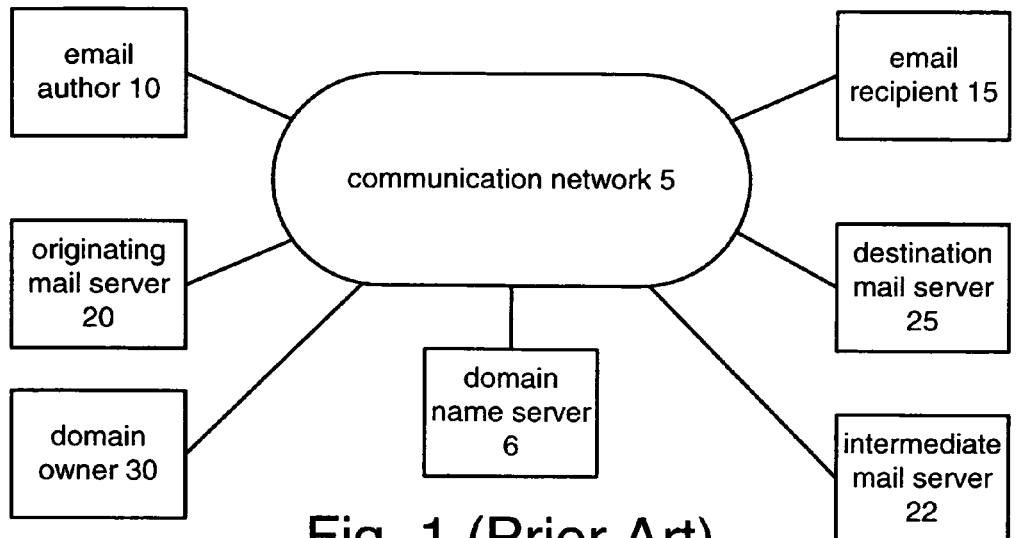
FIG. 1 is a diagram of a DKIM configuration showing email senders and receivers.
Figure 2:
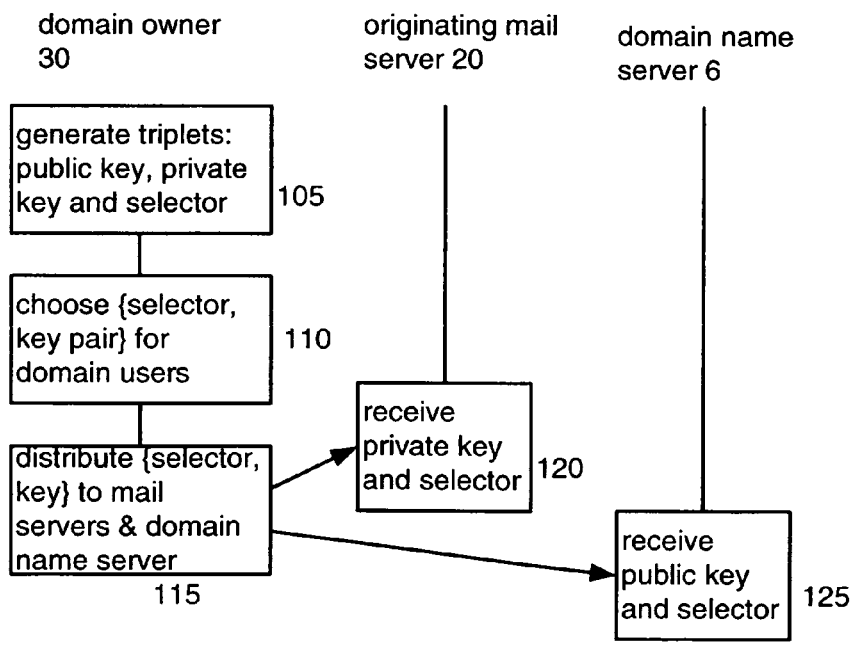
FIG. 2 is a flowchart showing set-up for DKIM.
Figure 3:
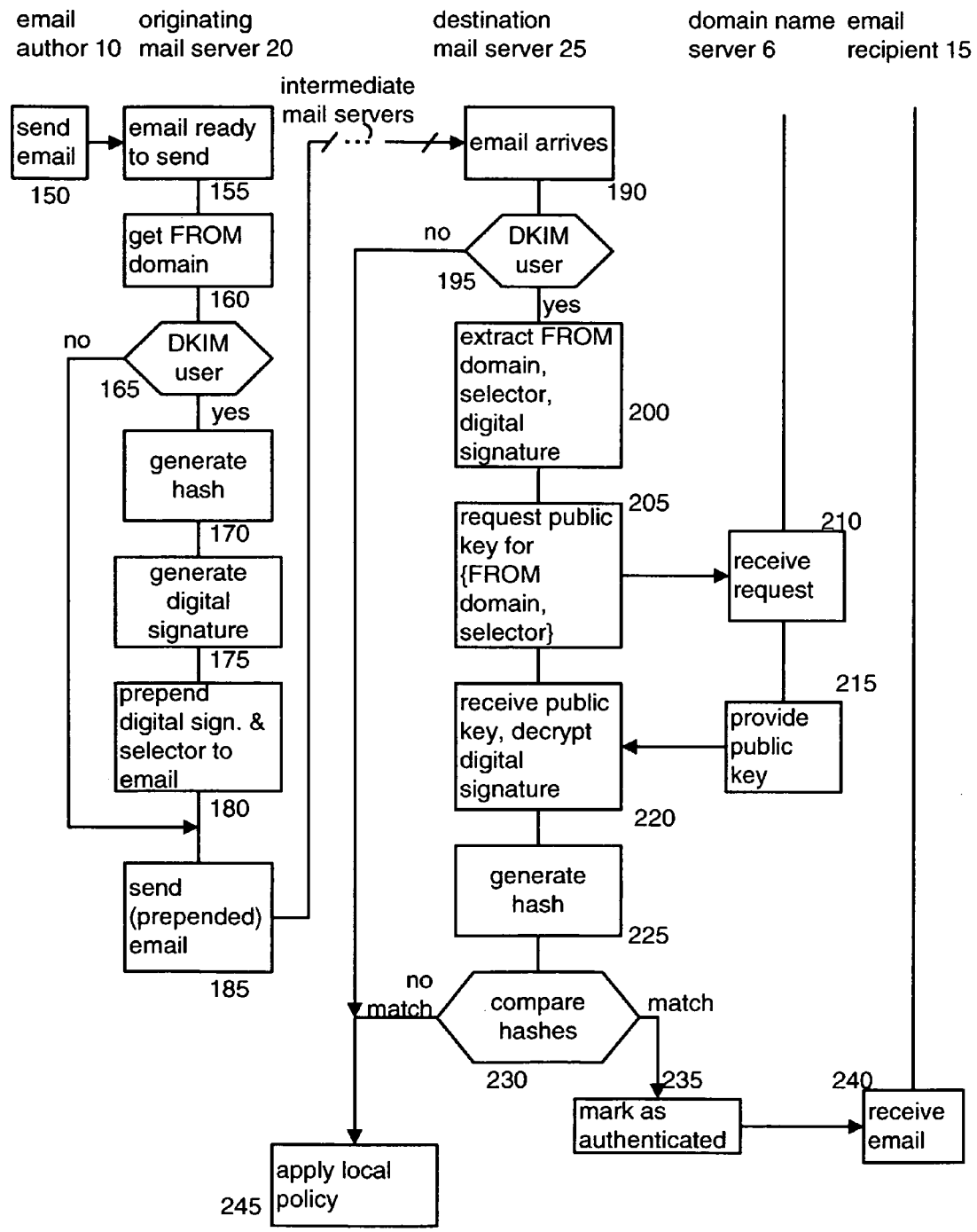
FIG. 3 is a flowchart showing operation of DKIM.

DomainKeys Identified Mail (DKIM) is a scheme for email authentication that allows an organization to take responsibility for a message, in a way that can be validated by a recipient. More specifically, DKIM enables an email recipient to authenticate an originating domain of a received email. The organization can be a direct handler of the message, such as the author, the originating sending site or an intermediary along the transit path. It can also be an indirect handler, such as an independent service that is providing assistance to a direct handler. DKIM is described in U.S. Pat. No. 6,986,049 (Delany), the disclosure of which is incorporated herein in its entirety; FIGS. 1-3 are based on the disclosure thereof.

FIG. 1 is a diagram of a DKIM configuration showing email senders and receivers. Communication network 5 is coupled to domain name server 6, email author 10, email recipient 15, originating mail server 20, destination mail server 25, and domain owner 30, each of which is a general purpose computer with suitable programming.

FIG. 2 is a flowchart showing set-up for DKIM. At step 105, domain owner 30, such as a corporation domain administrator, generates a triplet of {public key, private key, selector}. At step 110, domain owner 30 assigns the triplets to, e.g., different departments, offices or users having their own mail server. At step 115, domain owner 30 distributes the private keys and associated selectors to its mail servers, such as originating mail server 20, and the public keys and associated selectors to domain name server 6.

FIG. 3 is a flowchart showing operation of DKIM. At step 150, email author 10 creates an email, e.g., an email to email recipient 15, and sends the email to originating mail server 20.

At step 155, originating mail server 20 obtains the email that is ready for transmission, and gets the FROM domain from the email. At step 165, server 20 checks whether this domain uses DKIM, if not, server 20 simply sends the email to another mail server for transmission to email recipient 15. If the domain uses DKIM, then at step 170, server 20 generates a hash of the email message; at step 175, server 20 encrypts the hash using the private key received at step 120 of FIG. 2 to generate a digital signature. At step 180, server 20 prepends the digital signature and the selector associated with the private key to the email. At step 185, server 20 sends the prepended email on its way.

Because server 20 considers whether a domain uses DKIM in deciding whether to prepend a digital signature to an email, server 20 prepends the digital signature with regard to the identity of the email author.

Eventually, at step 190, sometimes via intermediate mail servers, the email arrives at destination mail server 25. At step 195, server 25 checks whether the email employs DKIM. If not, processing continues at step 245. If DKIM is employed, then at step 200, server 25 extracts the FROM domain, the selector and the digital signature from the received email. At step 205, server 25 sends a request for the public key associated with the FROM domain and the selector to domain name server 6.

At step 210, domain name server 6 receives the request. At step 215, domain name server looks up the requested public key and provides it to the requestor. It will be appreciated that the entire purpose of the selector is to enable a domain to have more than one public key.

At step 220, destination mail server 25 receives the public key, and decrypts the digital signature to yield a decrypted hash. At step 225, starting from the email message, server 25 generates a generated hash. At step 230, server 25 compares the decrypted hash with the newly generated hash; if they are the same, then at step 235, server 25 marks the email as authenticated, that is, verified to be from the FROM domain that it purports to be from, and delivers it to email recipient 15. Meanwhile, if the hashes do not match, then at step 245, server 25 applies local policy for suspected spam handling.

DKIM is used by only a few large organizations due to the overhead burden on domain owner 30, specifically, the need for its email domain administrator to actively participate in DKIM. Among other things, to actively participate in DKIM, an email domain administrator must manually input and update public keys at domain name server 6. Thus, there is not universal authentication of an email FROM domain, and so spammers continue to be able to forge addresses, thereby improving their success at improper activity.

As used herein and in the claims, "prepend" means attaching information to, or associating information with, an email message, whether at the start, the end, or elsewhere.

Mail Server Authentication

A scheme for universal mail server authentication will now be provided. This scheme requires no effort whatsoever from any domain owner, so its adoption is pain-free, at least to humans. This mail server authentication scheme enables an email recipient to authenticate the originating email server.

An address can refer to either the FROM address of an email identifying its author, or a mail server Internet Protocol (IP) address that transferred the email message to a subsequent mail server. For detecting a forged address, a hallmark of a spammer, either the domain authentication of DKIM that authenticates the FROM address, or the mail server authentication of the present scheme that authenticates the originating mail server address, are useful. The present scheme may operate in combination with Sender Policy Framework (SPF) to perform domain authentication.

Figure 4:
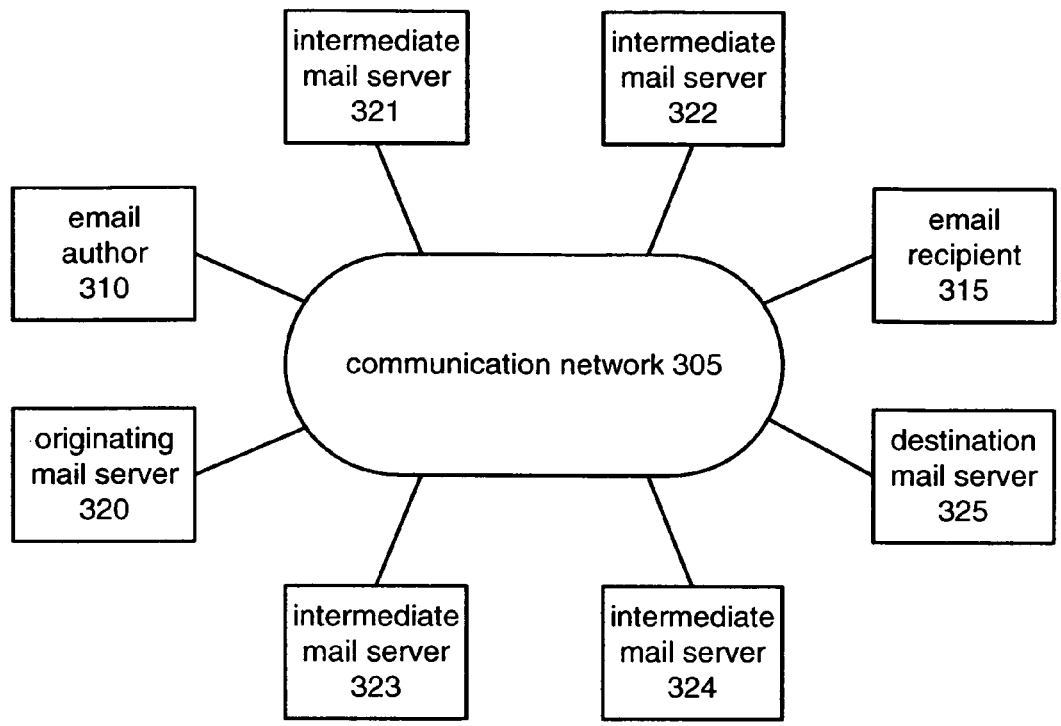
FIG. 4 is a diagram of a configuration showing email senders and receivers for mail server authentication.

FIG. 4 is a diagram of a configuration showing email senders and receivers for mail server authentication. Communication network 305 is, e.g., the Internet, or may be any private network generally for transmitting packets of digital information. Communication network 305 is coupled to email author 310, email recipient 315, originating mail server 320, intermediate mail servers 321, 322, 323, 324, and destination mail server 325, each of which is a general purpose computer with suitable programming, each of which may represent a plurality of similar elements. Email author 310 and email recipient 315 may be a personal computer with operating system and mail client, or a handheld device, and may use wireline or wireless transmission to communicate with communication network 305. Mail servers 320-325 execute mail server software such as Sendmail, Postfix, Microsoft's email programs, and so on.

Figure 5:
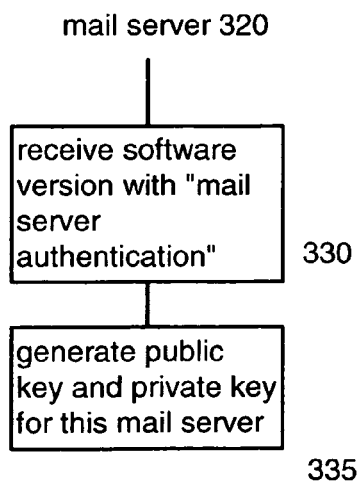
FIG. 5 is a flowchart showing set-up of mail server authentication.

FIG. 5 is a flowchart showing set-up of mail server authentication. At step 330, originating mail server 320 receives a mail server software version having mail server authentication software that operates as described below. Destination mail server 325 does not need the same mail server authentication software as originating mail server 320, however, destination mail server 325 must execute mail server software that enables it to operate as described below. At step 335, originating mail server 320 generates its own public key and private key for encrypting and decrypting data, and retains both keys.

In the setup phase of FIG. 5, the domain owner does not have to do anything. Similarly, domain name servers are not used in this authentication scheme. Selectors are not needed, as each mail server has its own public and private key.

Since each mail server generates its own public and private keys, and provides its public key to any requester, there is no difficulty in obtaining the public key, that is, the infrastructure problem that inhibits use of digital signatures for email authentication is avoided.

Figure 6:
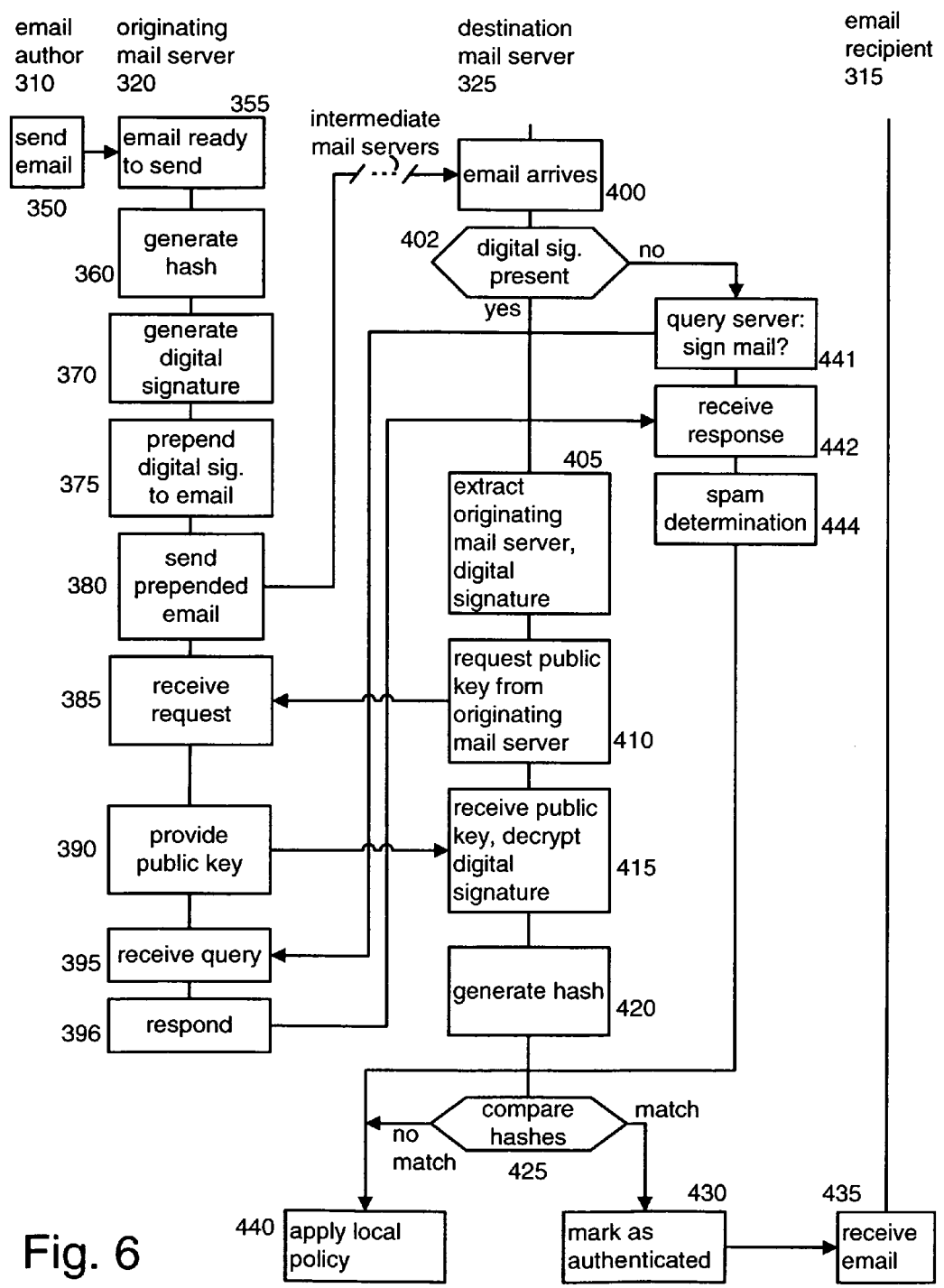
FIG. 6 is a flowchart showing operation of mail server authentication.

FIG. 6 is a flowchart showing operation of mail server authentication. At step 350, email author 310 creates an email, e.g., an email to email recipient 315, and sends the email to originating mail server 320.

At step 355, originating mail server 320 obtains the email that is ready to be sent. At step 360, server 320 generates a hash of the email message; at step 370, server 320 encrypts the hash using the private key generated at step 335 of FIG. 5 to generate a digital signature. At step 375, server 320 prepends the digital signature to the email. Server 320 prepends the digital signature to the email in all cases, that is, without regard to the identity of the email author. At step 380, server 320 sends the prepended email on its way.

Eventually, at step 400, the email arrives at destination mail server 325, typically having been routed through one or more of intermediate mail servers 321, 322, 323, 324.

At step 402, server 25 checks whether the received email includes a digital signature. If so, processing continues at step 405.

Even when the received email lacks a digital signature, the present technique is useful for spam detection. At step 441, server 325 extracts the originating mail server identification from the received email, and sends a query to the originating mail server asking whether the originating mail server adds a digital signature to its outgoing mail. At step 395, originating mail server 320 receives the query and, at step 396, server 320 responds that it does digitally sign its outgoing email. At step 442, destination mail server 325 receives the response, and at step 444, server 325 makes a spam determination relating to the received email, and processing continues at step 440. More specifically, if the response from originating mail server 320 is that it does sign its outgoing email, but the received email lacks a digital signature, then the email is definitely spam. If the response from server 320 is that it does not sign its outgoing email, and the received email lacks a digital signature, then it may or may not be spam. The ability to definitely determine that an email is spam at step 444 is a useful feature of the present technique.

At step 405, server 25 extracts the originating mail server and the digital signature from the received email. At step 410, server 325 sends a request to the originating mail server, herein server 320, for the public key of the originating mail server. In some embodiments, server 325 stores the public key previously received from popular originating mail servers, and so can skip step 410 and proceed directly to step 415.

At step 385, originating mail server 320 receives the request. At step 390, originating mail server 320 provides the requested public key to destination mail server 325.

At step 415, destination mail server 325 receives the public key, and decrypts the digital signature to yield a decrypted hash. At step 420, starting from the email message, server 325 generates a generated hash. At step 425, server 325 compares the decrypted hash with the newly generated hash; if they are the same, then at step 430, server 325 marks the email as authenticated, that is, verified to be from the originating mail server that it purports to be from, and delivers it to email recipient 315. In some embodiments, additional spam filtering is performed prior to delivery. Meanwhile, if the signatures do not match, then at step 425, server 325 applies local policy for suspected spam handling.

At step 435, email recipient 315 receives the email message written by email author 310.

This technique avoids the need for an email domain administrator to manually provide public keys to a central public key repository, since each mail server provides its own public key in response to any request for it.

This technique avoids the need for a domain administrator to do anything, since the originating mail server always digitally signs all outgoing mail. Should the destination mail server lack the ability to process the digital signature, then the original email is simply processed as usual, as if it had not been signed in a mail server authentication process.

Reputation databases for spam filtering, such as www.senderbase.org, presently provide reputation information for domains and for IP addresses. These databases are currently far more reliable at gauging the reputation of static IP addresses than they are for dynamic IP addresses as there is no reliable way to recognize an otherwise reputable mail server if it uses a dynamic IP address. The present technique enables reputation databases for IP addresses to repeatedly recognize a reputable server despite its use of a dynamic IP address, because the public key of a particular server remains the same even if its IP address changes. In short, a sending mail server can always be identified by its public key despite its use of a dynamic IP address.

This technique also makes it possible to identify if an unsigned email has a spoofed IP address listed in the email header, as shown above.

An organization can have multiple mail servers, each with its own public and private key. Alternatively, the same public and private key can be used by all mail servers associated with an organization. As another alternative, mail servers can be divided into groups, with each group sharing a public and private key. It is recognized that these alternatives requires manual intervention and reduce security, in that if one server is compromised, all servers sharing the same key are also compromised.

Personal Computer Authentication in Email

An ever-growing percentage of email originates from so-called zombie computers, that is, computers owned by innocent users, the computers having software surreptitiously installed by viruses and the like unleashed by spammers, the surreptitious software sending spam email from the innocent user's computer. Typically, the zombie computers operate in coordination and are referred to as "botnets".

It would be enormously helpful to automatically determine whether an email was sent by a trusted computer or a compromised zombie computer.

It would also be helpful to have a way to notify an innocent user that his or her computer is infected, which would in turn motivate the user to execute cleansing software. Users who do not know their computer is infected with zombie software generally do not execute the cleansing software.

Discussed below is a technique for authenticating the personal computer originating an email that enables zombie computers to be identified and their owners notified that their personal computer needs to be cleansed.

Figure 7:
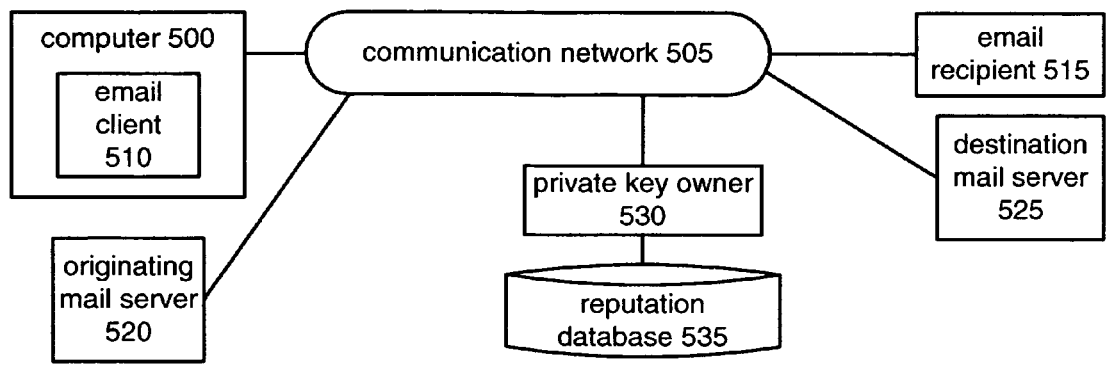
FIG. 7 is a diagram of a configuration showing email senders and receivers for personal computer authentication.

FIG. 7 is a diagram of a configuration showing email senders and receivers for personal computer authentication. Communication network 505, such as the Internet or any private network, is coupled to computer 500 executing email client 510 used by an email author, and email recipient 515 via suitable wireline or wireless communication channels. Computer 500, email recipient 515, originating mail server 520 and destination mail server 525 are each general purpose computers programmed in accordance with the present invention, such as a personal computer, handheld personal digital assistant, smart cellphone or the like; as used herein and in the claims, the term "personal computer" includes these devices and any other microprocessor-based device generally used by a single human at a time.

Email client 510 is email client software, such as a modified version of Microsoft Outlook, Apple's email program, Eudora or the like, modified to operate as discussed below. Email recipient 515 executes an email client, which may be from the same software vendor or a different software vendor than used by email client 510.

Originating mail server 520 operates to send email from email client 510 in a generally conventional manner. Destination mail server 525 operates as discussed below.

Communication network 505 is also coupled to private key owner 530, which is one or more general purpose computers programmed in accordance with the present invention. Private key owner 530 includes reputation database 535.

This technique assumes each personal computer that sends email has a unique number relative to all other personal computers. The unique number is kept confidential to that personal computer, that is, the unique number is transmitted only in encrypted form, and only a trusted party that maintains a secure database of unique numbers will be able to decrypt it. Ideally, the media access card or similar chip for each personal computer includes a 128-bit unique number generated by a central authority such as IEEE, which presently provides the 48-bit unique media access number; in this case, IEEE is private key owner 530.

In another embodiment, the unique number source need not be the private key holder. For example, IEEE or other entity generates a secret list of 128-bit numbers, distributes the secret numbers to the manufacturers of the media access cards, generates a hash for each secret number, and publishes the hash list. An outside entity verifies the authenticity of a unique number by hashing it and checking whether the hashed result matches any of the values in the published hash list. To retrofit existing personal computers, three sources of unique numbers are readily apparent.

First, personal computers running the Microsoft Windows operating system can use the Windows product key that was provided during installation of the operating system on the computer; in this case, Microsoft is private key owner 530. In a variation, if Microsoft releases the hashes of its product keys to another entity, that entity can function as private key owner 530.

Second, personal computers running the Apple operating system can use the hardware serial number of the machine, which is presumably an Apple manufactured personal computer, along with additional inforrnation, such as the media access control (MAC) address of a network card in the machine, to obtain a 128 bit number from Apple; in this case, Apple is private key owner 530. In a variation, if Apples releases the hashes of its 128 bit numbers to another entity, that entity can function as private key owner 530.

Third, other personal computers such as those running Linux will have to locally perform a very time consuming computation to obtain a unique number. An example of a suitable computation is presented in Abadi et al, "Moderately Hard, Memory-bound Functions", http://research.microsoft.com/pubs/54395/memory-longer-acm.pdf. The computation may be very burdensome, but if it only needs to be performed once, this is a suitable trade-off. The benefit of having a burdensome computation is that if a spammer tries to install unauthorized software, and the software commences the burdensome computation, the spam-generating capacity of the computer is substantially reduced because the computer is busy performing the computation. Another benefit is that the user may notice and cleanse their personal computer. Linux personal computers usually use Mozilla's Thunderbird as an email client; in this case, Mozilla is private key owner 530. Thunderbird automatically downloads updates for itself; the capability to perform the time-consuming computation and operate as discussed below can be provided in an update. Alternatively, Mozilla's Firefox browser can generate the unique number used by the Thunderbird email client.

Hybrid situations are possible. For example, a computer executing the Microsoft Windows operating system may employ Mozilla's Thunderbird email client. In this case, Thunderbird may access the Windows product key, and with Microsoft's cooperation, Mozilla holds the private key.

Conventionally, email client software programs usually include their identity and version in the "X-mailer" field of an email envelope, and the private key owner may be determined therefrom.

Additional private key owners may exist. In this technique, there are a finite number of private key owners that can readily be identified by predetermined private key owner identification codes, such as MSFT for Microsoft, IEEE for IEEE, APPL for Apple, MZLA for Mozilla, and so on, that are used when the "X-mailer" field of an email envelope is not employed, or to override whatever would normally be deduced as the private key owner from the "X-mailer" field.

Variations exist in other embodiments. For example, Microsoft (or Apple) can release the hashes of the product keys (or ID numbers) to a third party central authority, and email client developers can agree to only sign email with a public key whose corresponding private key is known to this central authority. Subsequently that central authority can act as both private key owner 530 and reputation database 535.

Each private key owner has a respective public key associated with its private key. The private key owner readily provides its public key to anyone who requests it. The private key is kept private.

Each private key owner maintains a reputation database for each of its unique numbers. Reputation database 535 is indexed by the unique number. A reputation report for a unique number includes how long the unique number has been in active use, the number of reported spam email events, the number of reported good email events, and optionally CAPTCHA bypass activity (discussed below) and how the unique number was obtained (e.g., computation, product ID code etc.)

During a set-up phase (not shown), each personal computer obtains a unique number, either from its media access card, its Windows product key, its Apple hardware serial numbers, and so on. The personal computer retains the corresponding private key owner identification code or expects to provide its email client information in the "X-mailer" field of the email envelope. The personal computer obtains the public key from the private key owner.

Figure 8:
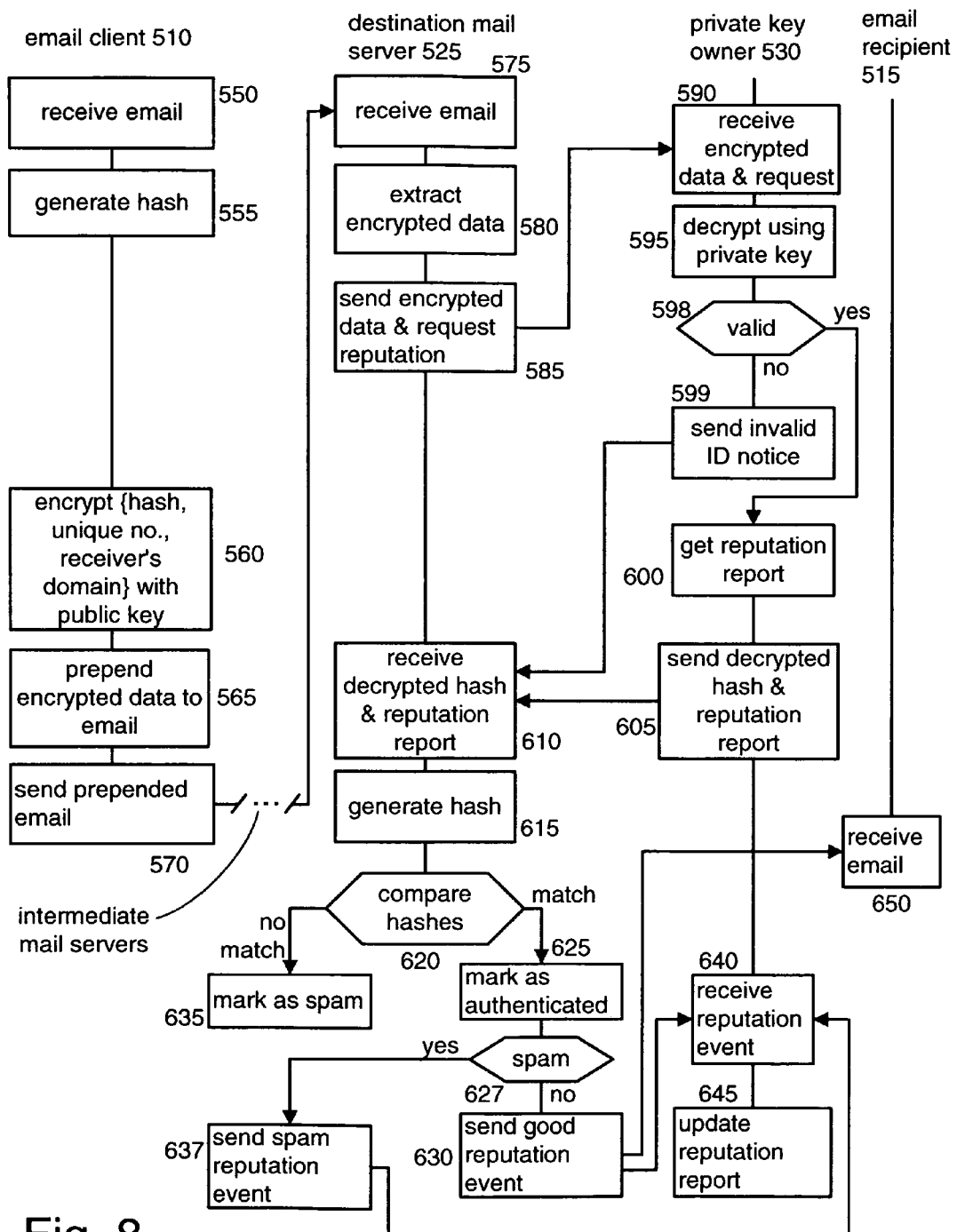
FIG. 8 is a flowchart showing operation of personal computer authentication for email.

FIG. 8 is a flowchart showing operation of personal computer authentication for email.

At step 550, email client 510 receives, from an email author, an email ready to be sent to email recipient 515. At step 555, email client 510 applies a hash function to the received email to generate a hash.

At step 560, email client 510 encrypts (i) the hash, (ii) the receiver's domain, and (iii) the unique number for computer 500, using the public key corresponding to the private key owner for reputation database 535. For example, if computer 500 uses a Microsoft operating system, then Microsoft is private key owner 530, and the Microsoft public key is used.

The hash of the email, generated by originating mail server 520, will be compared with a hash of the email, generated by destination mail server 525 to determine authenticity of the email, that is, to detect whether it is the same email as sent by email client 510.

The receiver's domain is included so that only the named receiver can provide spam notification to reputation database 535. Additionally, during decryption, private key owner 530 will be able to detect invalid data by comparing the receiver's domain in the decrypted data with the domain of the destination address in the email, i.e., the domain of destination mail server 525.

In some embodiments, the receiver's domain is omitted, and reputation database 535 records the entity that provided spam notification so that notices from unreliable sources can be removed.

The unique number for computer 500 will be used as an index, to retrieve a reputation report for computer 500 that is provided to destination mail server 525 to assist in evaluating whether the email is spam.

At step 565, email client 510 prepends the encrypted data, and optionally the private key owner identification code, to the email. At step 570, email client 510 sends the prepended email to originating mail server 520, which in turn sends the prepended email on its way to the recipient.

Eventually, at step 575, destination mail server 525 receives the prepended email, typically having been routed through one or more intermediate mail servers. At step 580, destination mail server 525 extracts the encrypted data and the private key owner identification code from the email. At step 585, destination mail server 525 sends the encrypted data to the private key owner indicated by the identification code, herein private key owner 530, along with a request for a reputation report.

At step 590, private key owner 530 receives the encrypted data and reputation request. At step 595, private key owner 530 decrypts the encrypted data using its private key. For embodiments encrypting the receiver's domain, at step 598, private key owner 530 checks whether the encrypted data indicates validity, that is, whether the decrypted receiver's domain matches the domain of destination mail server 525 that provided the encrypted data to private key owner 530. If invalid, then at step 599, private key owner 530 sends an invalidity notice to destination mail server 525; server 525 knows that the email is spam and can process the received email accordingly (see step 627 below).

When the receiver's domain is not part of the encrypted data, or the encrypted data indicates validity, at step 600, private key owner 530 retrieves the reputation report, associated with the unique number for computer 500 in the decrypted data, from reputation database 535. At step 605, private key owner 530 sends the retrieved reputation report and the decrypted hash to destination mail server 525. Note that the decrypted unique number is not sent to destination mail server 525.

At step 610, destination mail server 525 receives the decrypted hash and reputation report. Email associated with a mildly negative report will be accepted, although it may be classified as probable spam after more processing and then placed in a spam folder. Email associated with a strongly negative reputation report will not be accepted, e.g., server 525 issues a Simple Mail Transfer Protocol (SMTP) delivery rejection code to email client 510. At step 615, destination mail server 525 generates a hash for the received email. At step 620, destination mail server 525 compares the generated hash with the decrypted hash. If there is a match between the newly generated hash and the decrypted hash, then at step 625, destination mail server 525 marks the message as authenticated, and, at step 627, uses the reputation report in further spam processing.

If the message passes the further spam processing, i.e., is determined to not be spam, then at step 630, destination mail server 525 delivers the message to email recipient 515, and sends a notice of a good reputation event along with the encrypted data to private key owner 530. If the message fails the further spam processing, then at step 637, destination mail server 525 sends a spam reputation event to reputation database 535.

If the generated hash is different than the decrypted hash, then at step 635, destination mail server 525 marks the email as spam and processing is complete. This is not a reputation event because the email probably originated from a party other than computer 500, that is, the email address was spoofed by a spammer.

At step 640, private key owner 530 receives the reputation event from a reporting server, such as destination mail server 525, and, in embodiments encrypting the receiver's domain, checks the domain name server (not shown) of communication network 505 to verify that the IP address associated with the reporting server 525 is associated with the domain in the encrypted data, and at step 645, updates its reputation database. Updates to reputation database 535 are also accepted from trusted organizations, such as vendors of spam filtering software.

At step 650, email recipient 515 receives the email message sent by email client 510.

If computer 500 executing email client 510 is a compromised zombie (computer covertly infected with unwanted spam software) or if the ID number of computer 500 is being improperly used by another computer, then the reputation report for computer 500 reflects negative reports from spam associated with its ID number. Email client 510 receives SMTP delivery rejection notices from various destination mail servers, which indicate that computer 500 may have become a zombie.

Personal Computer Authentication for Websites

Websites that provide services, such as free email accounts, are often the targets of improper users who register for many accounts and then abuse them. To prevent programs from registering, that is, to ensure people register, such websites often employ a CAPTCHA test that is difficult for a computer to solve but relatively easy for a human to solve. Popular types of CAPTCHAs include graphic images of characters or words that have been subject to various visual distortions.

However, CAPTCHAs are generally annoying to humans, software programs can do a pretty good job of solving many CAPTCHAs, and spammers sometimes employ low-wage individuals to register for new accounts.

The technique described below protects websites from improper registrations and avoids the burden of a CAPTCHA on legitimate users. Instead, the website queries the user's device for its unique number, and then obtains a reputation report for the unique number. When the reputation report indicates that excessive activity is associated with the device, the website can decline to provide registration or take other appropriate action. When the reputation report indicates reasonable activity, then the website can provide registration without any burden on the user.

Figure 9:
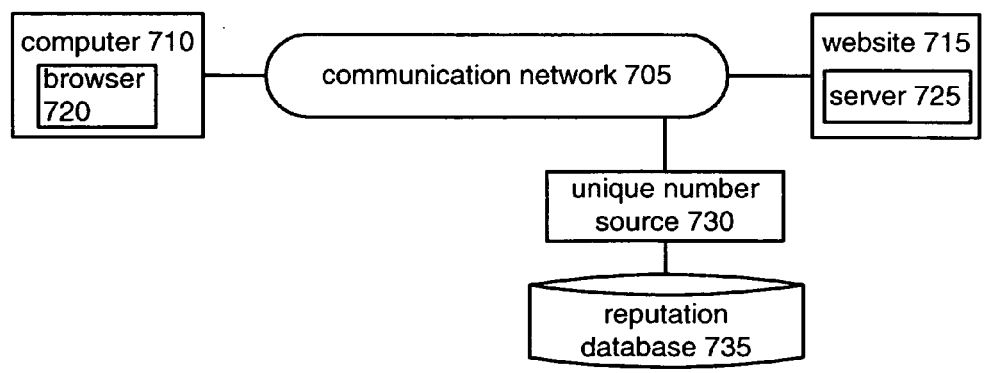
FIG. 9 is a diagram of a configuration showing users and websites for personal computer authentication.

FIG. 9 is a diagram of a configuration showing users and websites for personal computer authentication. Communication network 705, such as the Internet or any private network, is coupled to computer 710 and website 715 via suitable wireline or wireless communication channels. Computer 710 and website 715 are each general purpose computers programmed in accordance with the present invention. Computer 710 may be a personal computer, handheld personal digital assistant, smart cellphone or the like; as used herein and in the claims, the term "personal computer" includes these devices and any other microprocessor-based device generally used by a single human at a time. Computer 710 executes browser software 720 for interacting with websites. Website 715 executes server software 725 for interacting with browsers.

Communication network 705 is also coupled to unique number source 730, which is one or more general purpose computers programmed in accordance with the present invention. IN some embodiments, unique number source 730 is the same as private key owner 530 of FIG. 7.

During a set-up phase (not shown), each computer 710 obtains a unique number from unique number source 730, either from its media access card, its Windows product key, its Apple hardware serial number, and so on, as described above. The personal computer retains the corresponding private key owner identification code. The personal computer obtains the public key from the private key owner.

Browser 720 must be upgraded to provide the functionality discussed below. Fortunately, a small number of vendors account for almost the entire browser market, so widespread deployment of the technique discussed below can be accomplished via only this small number of vendors.

Figure 10:
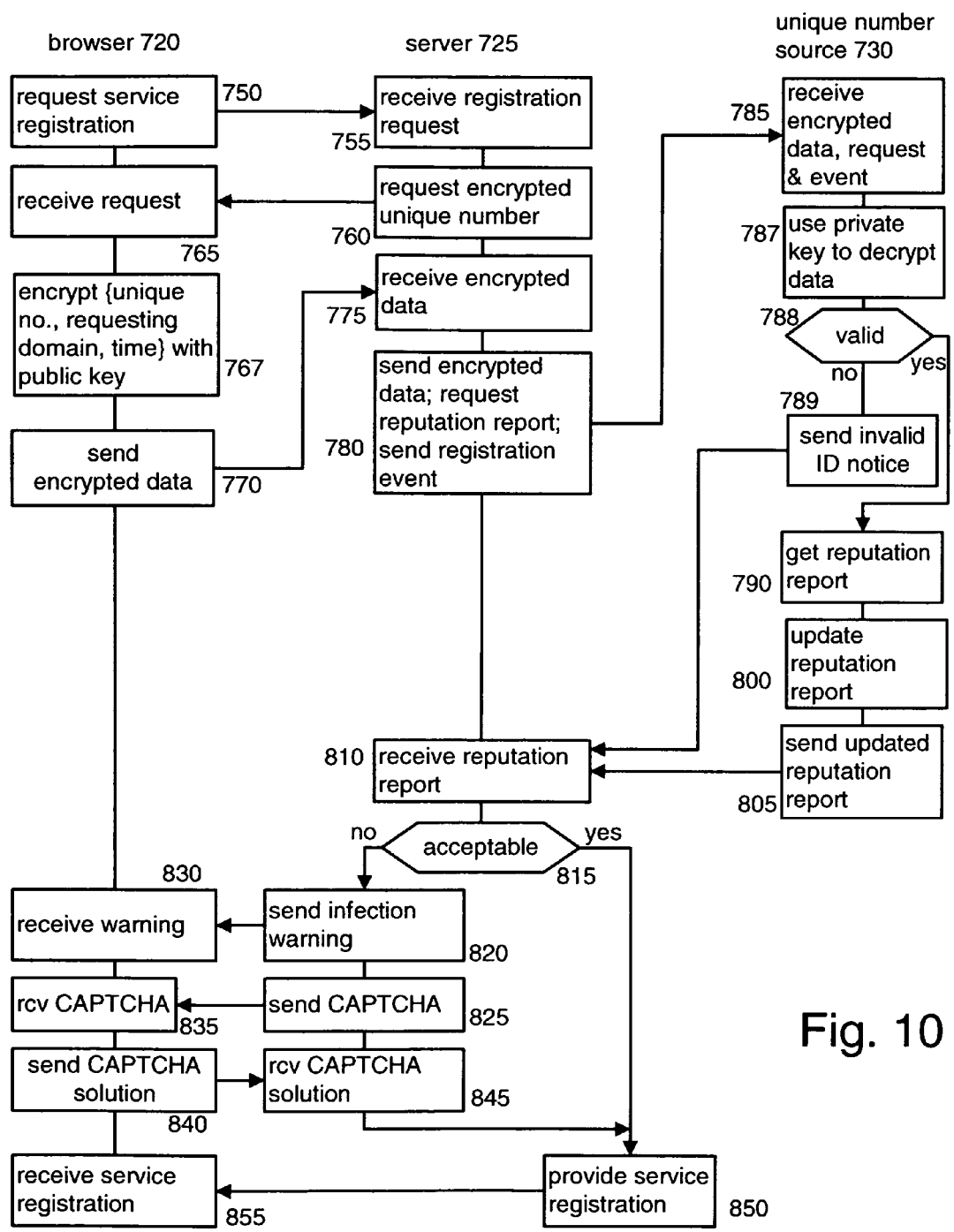
FIG. 10 is a flowchart showing operation of personal computer authentication for websites.

FIG. 10 is a flowchart showing operation of personal computer authentication for websites.

At step 750, browser 720 requests service registration from website 715. As used herein and in the claims, "requests service registration" encompasses any transaction in which browser 720 is requesting a resource from server 725. At step 755, server 725 receives the registration request. At step 760, server 725 requests that browser 720 send the unique number for the device that it is executing on, user personal computer 710, in encrypted form.

At step 765, browser 720 receives the request for its encrypted unique number. At step 767, browser 720 encrypts its unique number, the requesting domain associated with server 725, and a current timestamp, using the public key obtained from unique number source 730 during set-up, discussed above. The requesting domain is included to identify which domain can provide a reputation update. The timestamp is included to make each encrypted response unique, preventing re-use of a previous encrypted response even if it is intercepted by a spammer. In some embodiments, instead of a timestamp, a randomly generated number or a sequence number is used. At step 770, browser 720 sends the encrypted data to server 725.

At step 775, server 725 receives the encrypted data. At step 780, server 725 sends the encrypted data to unique number source 730 along with a request for a reputation report corresponding to the unique number, and a notice that registration has been requested.

At step 785, unique number source 730 receives the encrypted data, reputation report request and event notification. At step 787, source 730 uses its private key to decrypt the data. At step 788, unique number source 730 checks whether the encrypted data indicates validity, that is, whether the decrypted requesting domain matches the domain of server 725. If invalid, then at step 789, unique number source 730 sends an invalidity notice to server 725; server 725 knows that the request is forged and can process it accordingly.

When the encrypted data indicates validity, at step 790, source 730 gets the reputation report, associated with the unique number for computer 710 in the decrypted data, from reputation database 735. At step 800, source 730 updates its reputation report with the event in the notice. At step 805, source 730 sends the updated reputation report to server 725.

At step 810, server 725 receives the reputation report. If, at step 815, the report shows acceptable activity, with acceptable being defined locally by server 725, then at step 850, server 725 provides service registration, which is received by browser 720 at step 855.

If, at step 815, the report shows unacceptable activity, then at step 820, server 725 sends an infection warning to browser 720 and refuses to register based on the unique number. That is, the unacceptable activity is assumed to be due to unauthorized zombie software covertly operating on computer 710, that needs to be cleansed. At step 830, browser 720 receives the infection warning. At step 825, server 725 provides a CAPTCHA to browser 720, in the hope that there is an innocent user. In other embodiments, server 725 acts differently, for example, refusing to provide service registration until computer 710 is cleansed. At step 835, browser 720 receives the CAPTCHA. At step 840, browser 720 sends the CAPTCHA solution provided by a human user to server 725. At step 845, server 725 receives the CAPTCHA solution, and if it is correct, proceeds to service registration at step 850. If the CAPTCHA solution is incorrect, then the service registration request is denied.

At any subsequent time, not shown in FIG. 10, website 715 can report to reputation database 735 that a previously registered account is showing very heavy activity and/or malicious behavior indicating spam generation.

Figure 11:
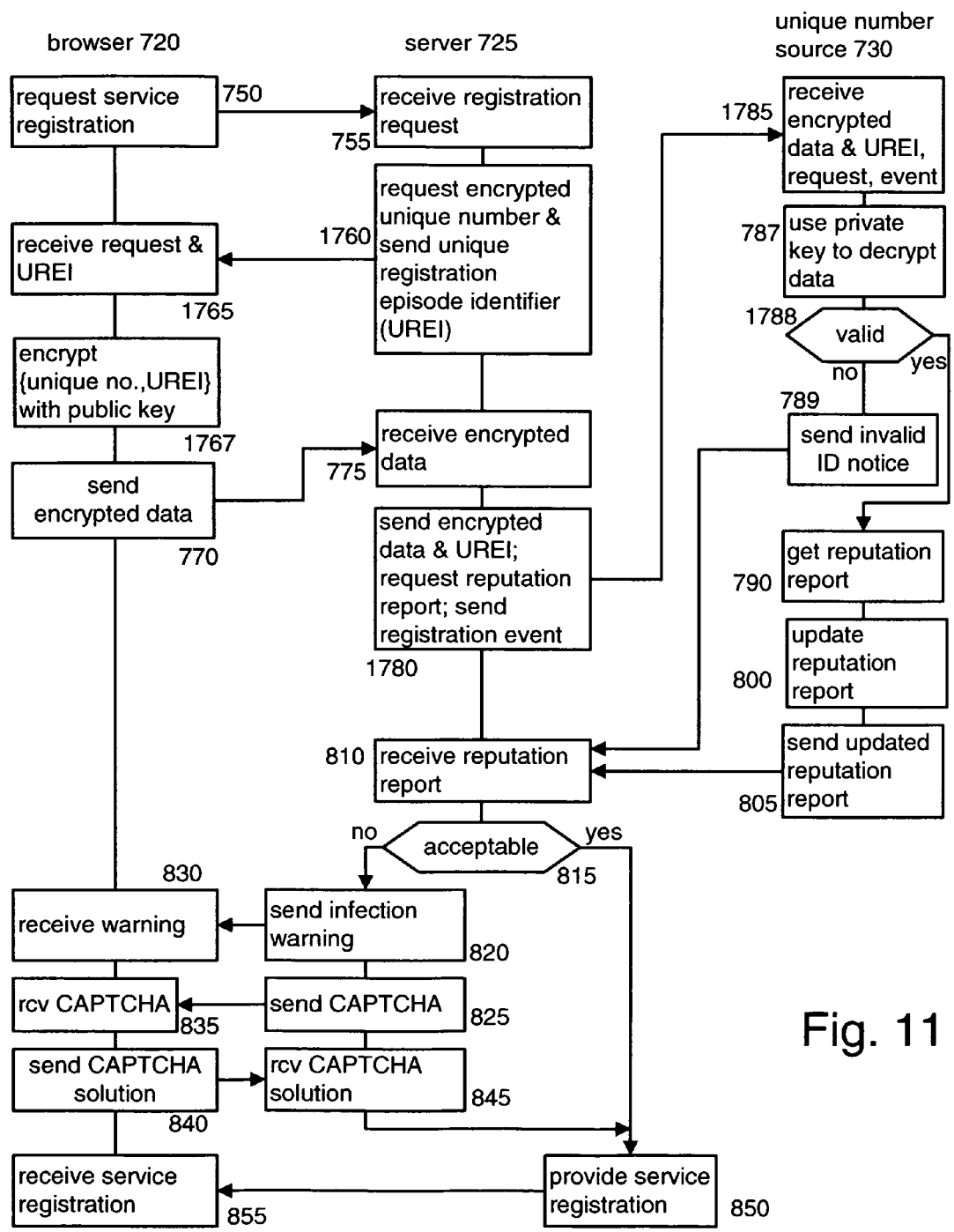
FIG. 11 is a flowchart showing operation of another embodiment of personal computer authentication for websites.

FIG. 11 is a flowchart showing operation of another embodiment of personal computer authentication for websites. The embodiment of FIG. 11 is similar to the embodiment of FIG. 10, and, for brevity, only differences will be discussed. As discussed below, in FIG. 11, server 725 generates a unique registration episode identifier (UREI), enabling browser 720 to omit the requesting domain and time stamp.

After step 755, at step 1760 in FIG. 11, server 725 generates a UREI, and sends the UREI to browser 720 along with the request for the browser's unique number. The UREI is unpredictable to a spammer, such as a combination of a random number and one of a timestamp or a datestamp, or any other conveniently generated number that is unique to the service registration process from the viewpoint of server 725. The UREI is preferably sent over a secure connection, such as using secure socket layer (SSL) encryption. Server 725 saves the UREI for use at step 1780.

It will be appreciated that one purpose of the UREI is to make the encrypted data unique so it cannot be submitted to server 725 multiple times, as might be done by spammer registering for service for improper purposes.

At step 1765, browser 720 receives the request for its unique number and the UREI.

At step 1767, browser 720 encrypts its unique number and the UREI with the public key for computer 710 to generate encrypted data, and at step 770, sends the encrypted data to server 725.

After receiving the encrypted data at step 775, at step 1780, server 725 sends the encrypted data and the UREI, saved at step 1760, to unique number source 730, along with a request for a reputation report for browser 720 and notice of the event that browser 720 is attempting to register for service at server 725.

At step 1785, unique number source 730 receives the encrypted data, reputation report request and event notification. At step 787, source 730 uses its private key to decrypt the data. At step 1788, unique number source 730 checks whether the encrypted data indicates validity, that is, whether the decrypted UREI matches the UREI received from server 725 and has not been previously used in a validity match.

At any time in the future (not shown in FIG. 11), server 725, or any server operated by the domain in question, can report improper usage and/or the volume of usage to reputation database 735, as long as the UREI is submitted with the report. Reputation database 735 allows a single UREI-domain pair to be used in report on activity pertaining only to a single registration event.

It will be appreciated that another purpose of the UREI is to enable the domain in question to report back to reputation database 735 without requiring that database 735 know the domain, or check the DNS record for the domain to make sure that the submitting server is affiliated with the domain.

Figure 12:
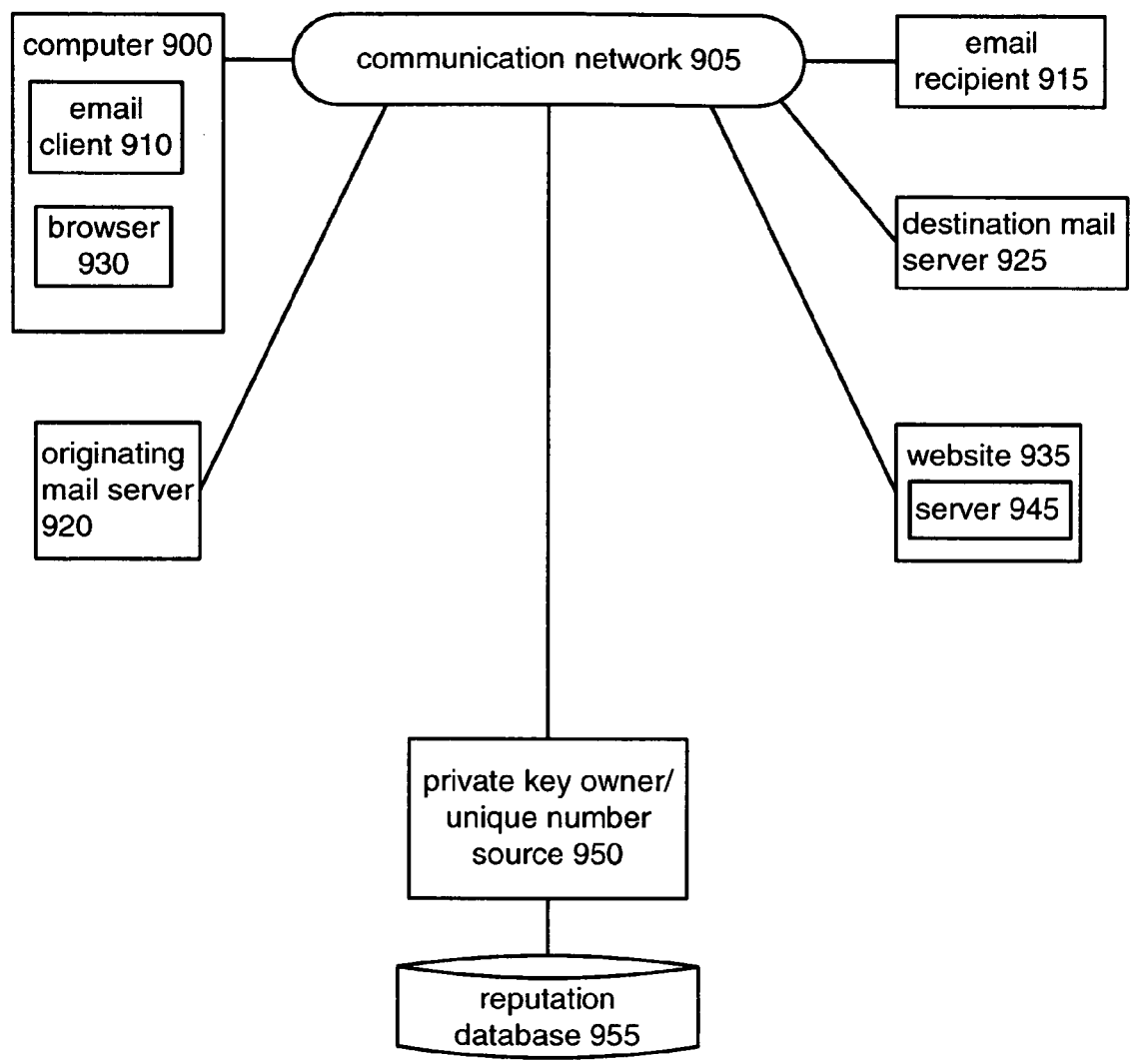
FIG. 12 is a diagram of a configuration showing email senders and receivers and users and websites for personal computer authentication.

FIG. 12 is a diagram of a configuration showing email senders and receivers and users and websites for personal computer authentication. This configuration is a combination of the configurations of FIGS. 7 and 9, advantageously enabling reputation database 955 to reflect the email and website service registration activity of computer 900.

Other types of malicious activity can be included in reputation database 955, such as voice over Internet protocol (VOIP) spam, online ticket hoarding, and so on.

After a personal computer has been identified as a likely zombie, the personal computer can rehabilitate its reputation by executing disinfection (cleansing) software; the cleansing software notifies reputation database 955 that a cleansing has occurred, and the reputation report for the personal computer includes this corrective action. For example, the Microsoft Update service already runs the Malicious Software Removal Tool program and the Genuine Advantage program. Alternatively, the personal computer can obtain a new unique number, such as by executing a time-consuming computation. The new unique number is linked to the old unique number in reputation database 955, so the previous infection can be a factor in deciding whether the personal computer has again become infected.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of obtaining a reputation report, comprising:
   encrypting, at a first computer, a unique identifier associated with the first computer to create encrypted data, the encrypted data having been encrypted using a public key associated with a master computer; and
   sending, from the first computer to a second computer, other data and the encrypted data so that the second computer can send the encrypted data to the master computer as part of a reputation report request, the reputation report request including the encrypted data, the master computer having a private key corresponding to the public key and, after receiving a reputation report, the second computer can decide whether the first computer is trustworthy and how to further process the other data from the first computer;
   wherein the master computer decrypts the encrypted data using the private key to provide the unique identifier, uses the unique identifier as an index to select the reputation report, and sends, to the second computer, the reputation report associated with the unique identifier; and
   wherein the second computer never obtains an unencrypted version of the unique identifier associated with the first computer.

2. The method of claim 1, further comprising:
   receiving, at the first computer, an email ready to be sent,
   generating, by the first computer, a hash for the received email,
   encrypting, by the first computer, the hash and the unique number using the public key of the master computer to generate the encrypted data,
   prepending, by the first computer, the encrypted data to the email, and
   sending, by the first computer, the prepended email to the second computer,
   wherein
      the second computer uses the reputation report to authenticate the prepended email.

3. The method of claim 2, wherein the unique identifier is obtained from a combination of a serial number in the hardware of the first computer and a media access card in the first computer.

4. The method of claim 2, wherein the unique identifier is a product key associated with an operating system of the first computer.

5. The method of claim 2, wherein the reputation report includes how long the unique identifier has been in use and a number of reported reputation events.

6. The method of claim 2, wherein the unique identifier is obtained from a time-consuming computation performed by the first computer.

7. The method of claim 1, wherein the other data is an email and the further processing of the second computer includes deciding whether the email is spam.

8. The method of claim 1, wherein the other data is a registration request and the further processing of the second computer includes deciding whether to provide the registration to the first computer.

9. A method of obtaining a reputation report, comprising:
   receiving, at a second computer, encrypted data and other data sent from a first computer, the encrypted data including a unique identifier associated with the first computer, the encrypted data having been encrypted using a public key associated with a master computer;
   sending, from the second computer to the master computer, a reputation report request, the reputation report request including the encrypted data, the master computer having a private key corresponding to the public key;
   receiving, at the second computer from the master computer, the reputation report associated with the unique identifier in the encrypted data after the master computer has decrypted the unique identifier using the private key and has used the decrypted unique identifier as an index to select the reputation report;
   deciding, at the second computer, whether the first computer is trustworthy; and
   further processing, at the second computer, the other data from the first computer based on the trustworthiness of the first computer;
   wherein the second computer never obtains an unencrypted version of the unique identifier associated with the first computer.

10. The method of claim 9,
   wherein the other data is an email, and wherein the further processing includes:
   determining, by the second computer, whether the email should be authenticated based on the reputation report, and
   delivering the email only when the email is determined to be authentic.

11. The method of claim 10, wherein the unique identifier is obtained from a combination of a serial number in the hardware of the first computer and a media access card in the first computer.

12. The method of claim 10, wherein the unique identifier is a product key associated with an operating system of the first computer.

13. The method of claim 10, wherein the reputation report includes how long the unique identifier has been in use and a number of reported reputation events.

14. The method of claim 10, wherein the unique identifier is obtained from a time-consuming computation performed by the first computer.

15. The method of claim 10, further comprising
receiving, at the second computer, a decrypted hash from the master computer,
generating, at the second computer, a generated hash based on the email, and
comparing, at the second computer, the decrypted hash with the generated hash to determine whether the email is authenticated.

16. The method of claim 10, further comprising notifying, from the second computer to the master computer, of a good reputation event when the first computer is determined to be authentic, and notifying, from the second computer to the master computer, of a bad reputation event when the first computer is determined to be inauthentic.

17. The method of claim 9,
wherein the other data is a resource request, and the further processing includes:
when the reputation report shows acceptable activity, providing the requested resource from the second computer to the first computer.

18. The method of claim 17, wherein the second computer notifies the master computer of a reputation update.

19. The method of claim 17, wherein the encrypted data includes a timestamp.

20. The method of claim 17, wherein the encrypted data includes a sequence identifier.

21. The method of claim 17, wherein the resource request is registration for a service provided by the second computer.

* * * * *